United States Patent
Mühlebach

(10) Patent No.: US 10,829,021 B2
(45) Date of Patent: Nov. 10, 2020

(54) IMPACT-RESILIENT MOUNTED TABLE DEVICE

(71) Applicant: GETA Gesellschaft für Entwicklung, Technik—Anwendung für Holz- und Kunststofferzeugnisse mbH, Wangen (DE)

(72) Inventor: Eugen Mühlebach, Neukirch (DE)

(73) Assignee: GETA Gesellschaft für Entwicklung, Technik—Anwendung für Holz- und Kunststofferzeugnisse mbH, Wangen (DE)

( * ) Notice: Subject to any disclaimer, the term of this patent is extended or adjusted under 35 U.S.C. 154(b) by 0 days.

(21) Appl. No.: 16/515,368

(22) Filed: Jul. 18, 2019

(65) Prior Publication Data

US 2020/0023762 A1   Jan. 23, 2020

(30) Foreign Application Priority Data

Jul. 18, 2018  (DE) .......................... 10 2018 117 399

(51) Int. Cl.
 *B60N 3/00* (2006.01)
 *A47B 5/00* (2006.01)
 (Continued)

(52) U.S. Cl.
 CPC ................ *B60N 3/001* (2013.01); *A47B 5/00* (2013.01); *F16F 1/36* (2013.01); *F16F 7/123* (2013.01);
 (Continued)

(58) Field of Classification Search
 CPC ...... F16F 1/36; F16F 7/123; F16F 9/02; F16F 9/10; F16F 1/04; F16F 2224/02;
 (Continued)

(56) References Cited

U.S. PATENT DOCUMENTS 3,985,374 A * 10/1976 Powaska ................ B60N 3/004
 280/730.1
5,658,050 A * 8/1997 Lorbiecki .................. B62J 1/12
 297/452.41

(Continued)

FOREIGN PATENT DOCUMENTS

| CN | 107191536 A | 9/2017 |
|---|---|---|
| DE | 60005192 T2 | 6/2004 |
| FR | 2994410 A1 | 2/2014 |

OTHER PUBLICATIONS

German Office Action dated Jun. 5, 2018 for German Patent Application No. 10-2018-117399.7.

*Primary Examiner* — Hanh V Tran

(74) *Attorney, Agent, or Firm* — Bachman & LaPointe, P.C.

(57) ABSTRACT

In a table device (100) with a tabletop (110), which is coupled to a support strut (120) for mounting on a wall for purposes of a support, a danger of injury to a person located in its vicinity during a sudden acceleration, especially in the direction of travel, is significantly reduced as compared to the known table devices (110) in that the tabletop (110) is fastened to a carrier platform (140) provided with mechanical damping elements (130, 131; 130', 131') and is indirectly connected to the support strut (120) across the mechanical damping elements (130, 131; 130', 131').

6 Claims, 3 Drawing Sheets

(51) Int. Cl.
  *F16F 1/36*  (2006.01)
  *F16F 7/12*  (2006.01)
  *F16F 9/02*  (2006.01)
  *F16F 9/10*  (2006.01)
  *F16F 1/04*  (2006.01)

(52) U.S. Cl.
  CPC ................. *F16F 9/02* (2013.01); *F16F 9/10* (2013.01); *F16F 1/04* (2013.01); *F16F 2224/02* (2013.01); *F16F 2224/0233* (2013.01)

(58) Field of Classification Search
  CPC .... F16F 2224/0233; B60N 3/001; A47B 5/00; A47B 13/003; A47B 3/12; B64D 11/0638; B61D 37/00
  See application file for complete search history.

(56) References Cited

U.S. PATENT DOCUMENTS

| | | | | |
|---|---|---|---|---|
| 9,580,085 | B2* | 2/2017 | Schmidt | B61D 37/00 |
| 10,485,332 | B2* | 11/2019 | Luebke | B60N 3/001 |
| 10,569,686 | B2* | 2/2020 | Le Corre | A47B 13/081 |
| 2011/0206894 | A1* | 8/2011 | Tsai | B32B 7/05 |
| | | | | 428/116 |
| 2011/0227353 | A1* | 9/2011 | Nagwanshi | F16F 7/12 |
| | | | | 293/137 |
| 2012/0132767 | A1* | 5/2012 | Schmidt | B61D 37/00 |
| | | | | 248/220.21 |
| 2013/0071609 | A1* | 3/2013 | Masse | B32B 27/40 |
| | | | | 428/117 |
| 2013/0186635 | A1* | 7/2013 | King | F16F 9/10 |
| | | | | 166/332.1 |
| 2015/0136550 | A1* | 5/2015 | Chen | F16F 9/10 |
| | | | | 188/316 |
| 2015/0157916 | A1* | 6/2015 | Gilkes | F16F 9/02 |
| | | | | 472/94 |
| 2015/0366337 | A1* | 12/2015 | Luebke | A47B 3/083 |
| | | | | 108/44 |
| 2016/0375810 | A1* | 12/2016 | Kong | B60N 3/002 |
| | | | | 297/145 |
| 2017/0037669 | A1* | 2/2017 | Kruedener | F16F 13/10 |
| 2017/0080954 | A1* | 3/2017 | Pailler | A47B 5/04 |
| 2017/0355465 | A1* | 12/2017 | Trimble | B60N 3/004 |
| 2018/0056846 | A1* | 3/2018 | Nasiri | B64D 11/00 |
| 2018/0170549 | A1* | 6/2018 | Jussli | B64D 11/00153 |
| 2019/0152415 | A1* | 5/2019 | Tung | B60R 19/48 |

* cited by examiner

IMPACT-RESILIENT MOUNTED TABLE DEVICE

CROSS-REFERENCE TO RELATED APPLICATION

Priority is claimed of German patent application DE102018117399.7, filed Jul. 18, 2018, the disclosure of which is incorporated by reference herein in its entirety as if set forth at length.

BACKGROUND

The invention relates to a table device with a tabletop which is coupled to a support strut for purposes of support. The support strut may be braced directly against a wall or indirectly against a stand surface.

Table devices of the mentioned kind are used in the prior art as fixtures for stowing objects of various kinds. The known table devices however have the drawback that, when mounted in a train car or inside a touring bus, due to a fixed connection with the interior paneling of the train car or touring bus, they represent an impact edge for a person seated at the table in event of an abrupt acceleration, such as in particular a sudden braking maneuver of the respective vehicle, and may represent a clear danger of serious injury to that person depending on the forcefulness of the sudden acceleration acting as an impact.

SUMMARY

The problem which the invention proposes to solve is therefore to create a table device for mounting inside a movable interior such as that of a train car, a ship, or a touring bus, in which a danger of injury to a person located in its vicinity during a sudden acceleration, especially in the direction of travel, is significantly reduced as compared to the known table devices.

For a table device of the kind mentioned at the outset, this problem is solved according to the invention in that the tabletop is fastened to a carrier platform provided with mechanical damping elements and is indirectly connected to the support strut across the mechanical damping elements.

Preferred embodiments of the invention are the subject matter of the dependent claims, whose elements act in the sense of a further improvement of the solution approach adopted by the invention.

In the table device according to the invention, thanks to its combination of features such that the tabletop is fastened to a carrier platform provided with mechanical damping elements and connected across the mechanical damping elements indirectly to the support strut, and in the event of a sudden acceleration of a person located in the vicinity of the table device, a dampening of the impact of the person against an edge of the respective tabletop is achieved in relation to the table device, so that there is a significant lessening of the risk of injury as compared to the rigidly suspended tabletops of the prior art.

According to a first preferred embodiment of the table device according to the invention, it is provided that the support strut, the carrier platform and the tabletop are oriented horizontally.

According to another preferred embodiment of the table device according to the invention, the damping elements are oriented horizontally on a carrier platform, in order to provide maximum effectiveness during an expected acceleration in the horizontal direction.

So as not to be an impediment and not present any risk of injury, and for protection against unwanted mechanical actions from the outside, the damping elements are preferably integrated inside respective recesses in a carrier platform.

As a rule, the tabletop of a table device according to the invention is rectangular in shape and has two mutually parallel oriented main side edges and two secondary side edges oriented parallel to each other and being shorter than the main side edges, and the damping elements are oriented perpendicular to the main side edges of the tabletop.

In order to bring about a uniform unidirectional dampening, preferably each time two damping elements for dampening an impact against a first one of the two main side edges are provided and each time two damping elements for dampening an impact against a second one of the two main side edges are provided.

According to a preferred embodiment, a first damping element of the two damping elements for dampening an impact against the first main side edge is arranged in the area of a first secondary side edge of the tabletop and a second damping element of the two damping elements for dampening an impact against the first main side edge is arranged in the area of a second secondary side edge of the tabletop.

Accordingly, a first damping element of the two damping elements for dampening an impact against the second main side edge is preferably arranged in the area of a first secondary side edge of the tabletop and a second damping element of the two damping elements for dampening an impact against the second main side edge is preferably arranged in the area of a second secondary side edge of the tabletop.

The nature of a damping element should be chosen according to the weight of a tabletop and the hardness of an expected impact of a person against the tabletop. Thus, for example, a damping element may be made of an elastic plastic material, and then the damping element is preferably long and narrow in configuration and mounted by form fitting in a long narrow cavity of the carrier platform.

According to one preferred embodiment of the table device according to the invention, a damping element is formed from an elastically or in elastically compressible damping body with undulating shape in the linear direction, which is inserted by form fitting into a long narrow cavity of the carrier platform.

According to another preferred embodiment of the table device according to the invention, a damping element is formed from a plastically compressible damping body with undulating shape in the linear direction, which is inserted by form fitting into a long narrow cavity of the carrier platform. Preferably, a plastic deformation occurs during a compression of the damping body only after a given defined strength of an impulse acting on an edge of the tabletop.

In general, a damping element may be formed by a spiral spring, a gas spring or a hydraulic spring, which is introduced with form fitting into a long narrow cavity of the carrier platform.

BRIEF DESCRIPTION OF THE DRAWINGS

The table device according to the invention shall be explained in the following with the aid of a preferred embodiment, represented in the figures of the drawing. There are shown.

DETAILED DESCRIPTION

Figure 1:
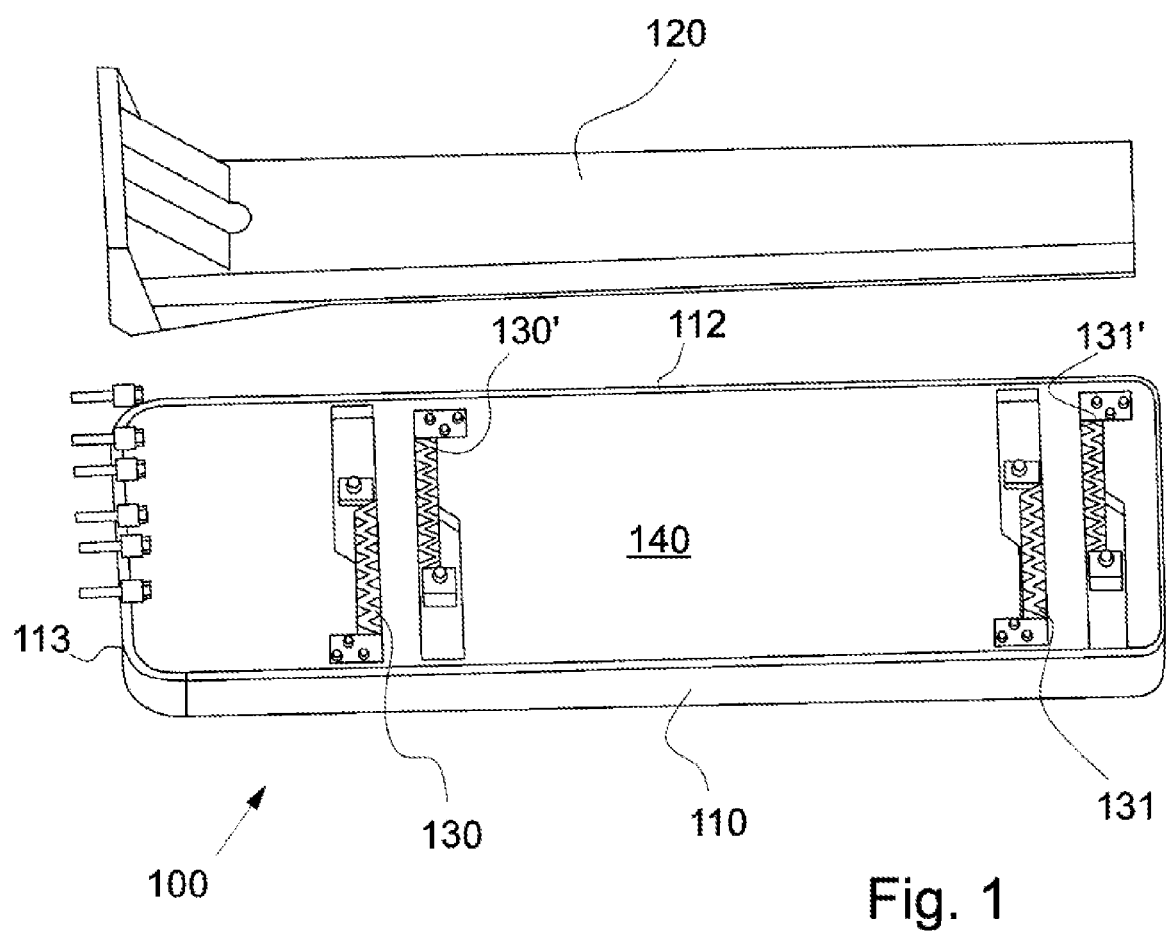
FIG. 1 a preferred embodiment of the bearing elements of a table device according to the invention in an exploded view slanted from below.
Figure 2:
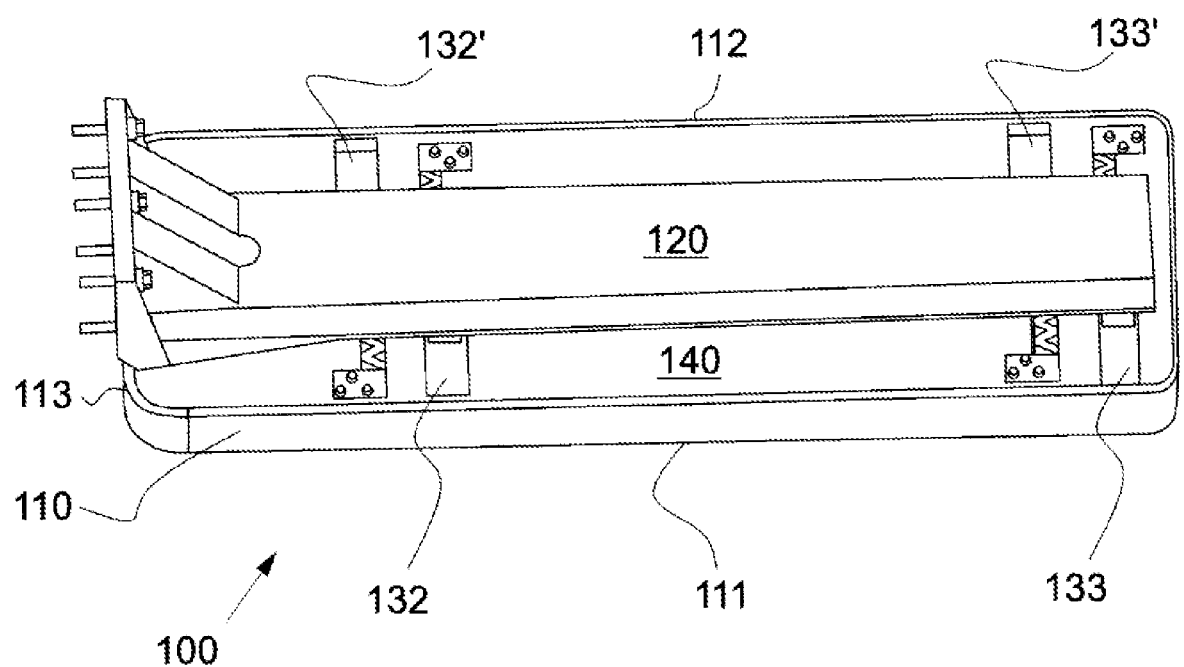
FIG. 2 the preferred embodiment shown in FIG. 1 of the assembled bearing elements of a table device according to the invention in a view slanted from below.
Figure 3:
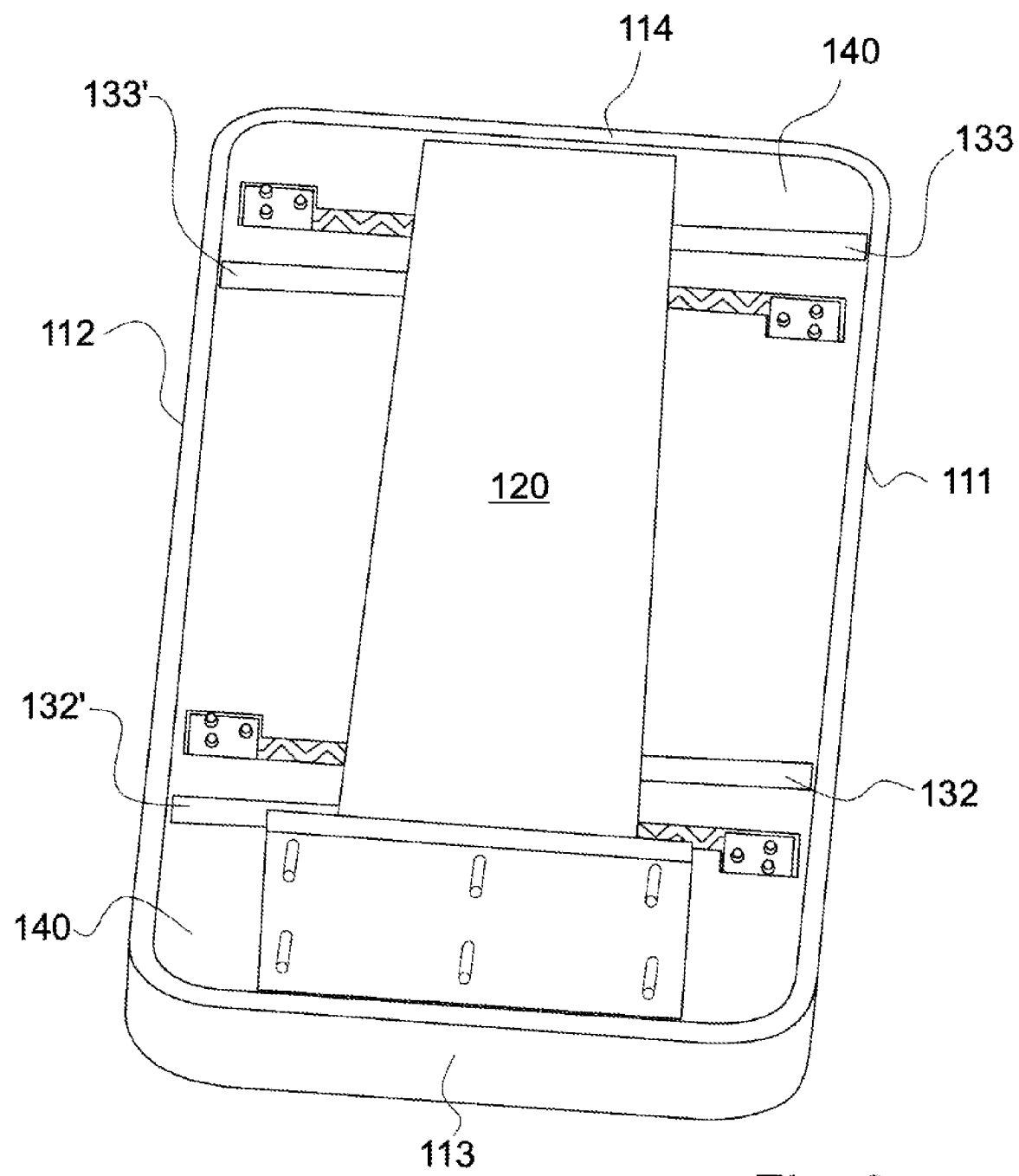
FIG. 3 the preferred embodiment shown in FIG. 1 of the assembled bearing elements of a table device according to the invention in a view from below.

The table device 100 according to the invention as represented in FIGS. 1 to 3 contains a tabletop 110, which is coupled to a support strut 120 for purposes of a fastening to the interior paneling of a train car, whose free end can be firmly mounted on a wall of a car. The tabletop 110 is mounted on a carrier platform 140 provided with mechanical damping elements 130, 131; 130', 131' and indirectly connected across the mechanical damping elements 130, 131; 130', 131' to the support strut 120. The support strut 120, the carrier platform 140 and the tabletop 110 are horizontally oriented in a conventional manner.

The damping elements 130, 131; 130', 131' are mounted horizontally oriented on a carrier platform 140 and are integrated inside a respective recess 132, 133; 132', 133' in the carrier platform 140.

The tabletop 110 is rectangular in shape and has two mutually parallel oriented main side edges 111, 112 and two secondary side edges 113, 114 oriented parallel to each other and being shorter than the main side edges 111, 112, and the damping elements 130, 131; 130', 131' are oriented perpendicular to the main side edges 111, 112 of the tabletop 110.

Each time two damping elements 130', 131' for dampening an impact of a person located in the vicinity of the table device 100 against a first one of the two main side edges 111, 112 are provided and each time two damping elements 130, 131 for dampening an impact of a person located in the vicinity of the table device 100 against a second one of the two main side edges 111, 112 are provided.

A first damping element 130' of the two damping elements 130', 131' for dampening an impact against the first main side edge 111 is arranged in the area of a first secondary side edge 113 of the tabletop 110 and a second damping element 131' of the two damping elements 130', 131' for dampening an impact against the first main side edge 111 is arranged in the area of a second secondary side edge 114 of the tabletop 110.

A first damping element 130 of the two damping elements 130, 131 for dampening an impact against the second main side edge 112 is arranged in the area of a first secondary side edge 113 of the tabletop 110 and a second damping element 131 of the two damping elements 130, 131 for dampening an impact against the second main side edge 112 is arranged in the area of a second secondary side edge 114 of the tabletop 110.

Each damping element 130, 131; 130', 131' is formed from an elastically compressible damping body with undulating shape in the linear direction, which is inserted by form fitting into a long narrow cavity 132, 133; 132', 133' of the carrier platform 140.

The above discussed exemplary embodiment of the invention serves merely for the purpose of a better understanding of the teaching of the invention as provided by the claims, which in itself is not limited by the exemplary embodiment.

LIST OF REFERENCE DESIGNATIONS

The following is a list of reference numerals:
110 Table device
110 Tabletop
111, 112 Main side edge
113, 114 Secondary side edge
120 Support strut
130, 131, 130', 131' Damping elements
132, 133, 132', 133' Recesses
140 Carrier platform

What is claimed is:

1. A table device (100) with a tabletop (110), which is coupled to a support strut (120) for purposes of a support, wherein:
   the tabletop (110) is fastened to a carrier platform (140) provided with mechanical damping elements (130, 131; 130', 131');
   the support strut (120), the carrier platform (140) and the tabletop (110) are oriented horizontally;
   the damping elements (130, 131; 130', 131') are oriented horizontally on the carrier platform (140);
   the damping elements (130, 131; 130', 131') are integrated inside respective recesses (132, 133; 132', 133') in the carrier platform (140);
   the tabletop (110) is rectangular in shape and has two mutually parallel oriented main side edges (111, 112) and two secondary side edges (113, 114) oriented parallel to each other and being shorter than the main side edges (111, 112), and the damping elements (130, 131; 130', 131') are oriented perpendicular to the main side edges (111, 112) of the tabletop (110);
   the tabletop (110) is indirectly connected to the support strut (120) across the mechanical damping elements (130, 131; 130', 131');
   said damping elements include two damping elements (130', 131') for dampening an impact against a first one (111) of the two main side edges (111, 112) and two damping elements (130, 131) for dampening an impact against a second one (112) of the two main side edges (111, 112);
   a first damping element (130') of the two damping elements (130', 131') for dampening an impact against the first main side edge (111) is arranged in the area of a first secondary side edge (113) of the tabletop (110) and a second damping element (131') of the two damping elements (130', 131') for dampening an impact against the first main side edge (111) is arranged in the area of a second secondary side edge (114) of the tabletop (110); and
   a first damping element (130) of the two damping elements (130, 131) for dampening an impact against the second main side edge (112) is arranged in the area of a first secondary side edge (113) of the tabletop (110) and a second damping element (131) of the two damping elements (130, 131) for dampening an impact against the second main side edge (112) is arranged in the area of a second secondary side edge (114) of the tabletop (110).

2. A table device (100) according to claim 1 characterized in that the mechanical damping elements (130, 131; 130', 131') are made from an elastic plastic material.

3. A table device (100) according to claim 2, characterized in that each of the mechanical damping elements (130, 131; 130', 131') are long and narrow in configuration and mounted by form fitting in a long narrow cavity of the respective recess (132, 133; 132', 133') of the carrier platform (140).

4. A table device (100) according to claim 1 characterized in that each of the mechanical damping elements (130, 131; 130', 131') are formed from a plastically compressible damping body with undulating shape in the linear direction, which is inserted by form fitting into a long narrow cavity of the respective recess (132, 133; 132', 133') of the carrier platform (140).

5. A table device (100) according to claim 4, characterized in that a plastic deformation during a compression of a damping body (130, 131; 130', 131') occurs only after a given defined strength of an impulse acting on an edge of the tabletop (110).

6. A table device (100) according to claim 1, characterized in that each of the mechanical damping elements (130, 131; 130', 131') are formed by a hydraulic spring, which is introduced with form fitting into a long narrow cavity of the respective recess (132, 133; 132', 133') of the carrier platform (140).

\* \* \* \* \*